March 17, 1959 P. SCHANE, JR., ET AL 2,878,115
OPEN-HEARTH STEELMAKING PROCESS
Filed Sept. 14, 1956
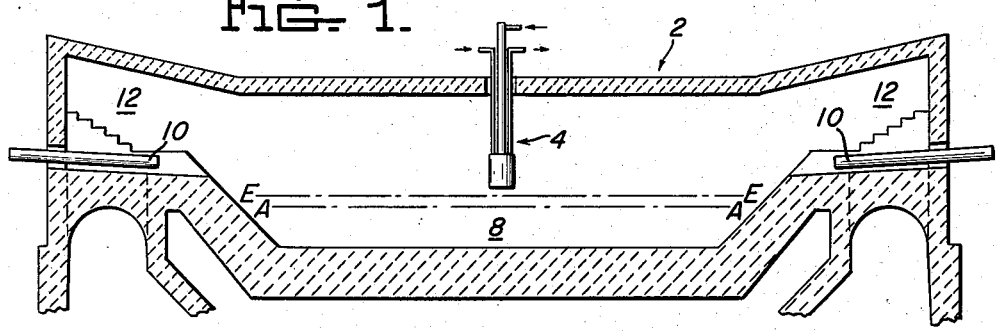
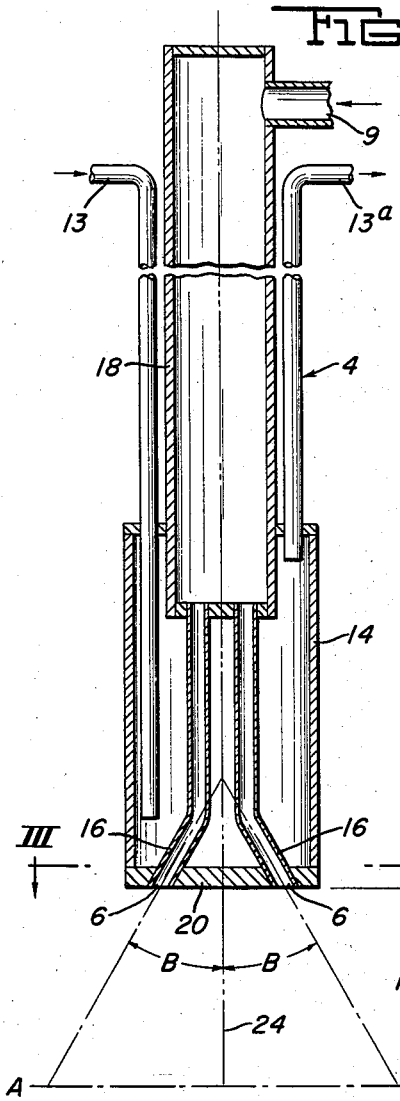
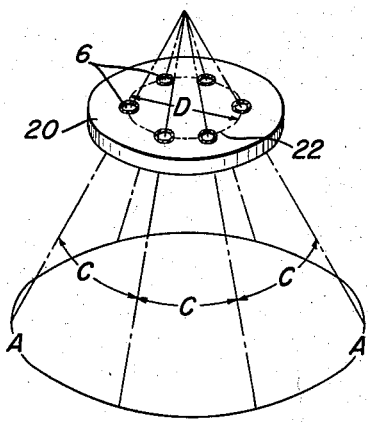
INVENTORS:
PHILIP SCHANE, Jr. and
WILLARD U. TAYLOR,
By: Donald G. Dalton
their Attorney.

United States Patent Office 2,878,115
Patented Mar. 17, 1959

2,878,115

OPEN-HEARTH STEELMAKING PROCESS

Philip Schane, Jr., and Willard U. Taylor, Pittsburgh, Pa., assignors to United States Steel Corporation, a corporation of New Jersey Application September 14, 1956, Serial No. 610,001

3 Claims. (Cl. 75—52)

This invention relates to a method for producing steel by the open-hearth process and more particularly an improved method for introducing oxygen directly into the molten bath in the open-hearth process during the period following the molten iron addition until carbon is reduced to about the desired level.

The open-hearth process is adapted to making all grades of steel and permits the use of large quantities of scrap therein. It is however a relatively slow process requiring a very large investment in capital equipment. Accordingly, improvement in the productive capacity of the process is of great importance to the steel industry.

The rate of refining in the open hearth process is a function of the rate at which heat can be transferred from the fuel flame to the metal bath. During the refining, the charge is necessarily covered by a layer of slag which unfortunately interferes with transfer of heat to the metal. In addition to this insulating effect, the slag layer reflects heat from the fuel flame against the roof and this results in shortened roof life and costly repairs if attempts are made to shorten the refining period by increasing the rate of fuel input.

Theoretically these problems could be solved by introducing the heat below the slag layer as is done in the so-called pneumatic processes wherein an oxidizing blast in direct contact with the metal bath is the source of heat. However past attempts to use blasts of air or oxygen against or beneath the surface of the bath in the open-hearth furnace have failed because of excessive splashing and fuming, except in the limited case wherein oxygen has been introduced only after the carbon has been reduced to about 0.3%. The latter practice is applicable only in the production of low carbon steel.

Accordingly, it is an object of the present invention to provide a method for applying oxygen to the metal bath in an open-hearth furnace for essentially the full time from hot metal addition to tap, to materially decrease the tap-to-tap time, and at the same time retain the inherent control features of the open-hearth process.

It is another object to provide a method affording improved heat utilization and reduced fuel consumption.

A further object is to provide a method of utilizing oxygen in the open hearth at high carbon as well as low carbon contents in the bath.

It is a still further object to provide a method of utilizing oxygen throughout the period from hot metal addition to tap without objectionable fuming and splashing.

The foregoing and further objects will be apparent from the following specification when read in conjunction with the attached drawings wherein:

Figure 1 is a schematic showing of an open-hearth furnace including means for introducing an oxygen blast in accordance with the principles of the present invention;

Figure 2 is a cross-sectional view of one type of means for introducing the oxygen blast in accordance with the subsequently described principles; and Figure 3 is a schematic perspective view of the orifice arrangement taken on line III—III of Figure 2.

Referring more particularly to the drawings, in Figure 1 we have shown schematically an open-hearth furnace 2 embodying means 4 having a multiplicity of orifices 6 for introducing oxygen. The means 4, which will be termed a lance, is preferably disposed above the central portion of the hearth 8 and is retractably mounted so that it can be lowered to proper operating position and withdrawn during charging and tapping. The furnace includes conventional oppositely disposed burners 10 in ports 12. The supply of fuel and air to each of the burners is controlled by conventional means not shown. The normal level of the metal during refining is indicated by dotted line A—A; the level of slag by line E—E. The lance 4 is shown in operating position and is connected to a suitable supply of oxygen as at 9; the supply line being provided with conventional controls not shown. As shown in Figures 2 and 3, the lance 4 comprises a water-jacketed end portion 14 having a suitable inlet and outlet 13 and 13a respectively enclosing six oxygen discharge tubes 16 connected to a header portion 18 and terminating in the discharge orifices 6 in the end plate 20. The orifices 6 are disposed in the end plate 20 at equidistant points about a circular centerline 22 having a diameter $d$, and the ends of the tubes 16 are bent outwardly at an angle B from the vertical axis 24 to cause the individual jets of oxygen issuing from the end plate 20 to diverge at an angle C between adjacent jets and contact the bath surface at six separate spots spaced along a circle having a radius equal approximately to ($h$ times tan $B+\frac{1}{2}d$) where $h$ is the distance from the bath surface to the bottom of the discharge end of the lance, and B and $d$ are respectively the angle and diameter defined above.

The operational losses and difficulties occasioned by excessive splashing and fuming which have heretofore prevented the use of oxygen in the open hearth when the bath contains more than about 0.3% carbon are avoided by the following practices.

The charge is calculated in the usual manner, that is, quantities of scrap and hot metal may be any that fit the practices of the individual open hearth shop; the quantities of lime and ore, as dictated by the quantities and analyses of scrap and hot metal to be charged. If desired, the iron oxide requirement may be reduced to allow for oxygen supplied by the lance during refining.

Any normal charging pattern can be used except that those practices known to produce violent boiling during the early stages of the refining should be avoided. Such boiling is particularly undesirable in the vicinity of the lance and for this reason limestone should not be charged in the area immediately below the lance.

As previously stated, an aim of the present invention is to materially reduce tap-to-tap time in the open hearth without sacrificing the control of refining afforded by the conventional open-hearth practices. To achieve this objective, the amount of oxygen used during the refining period, i. e. introduced after the hot metal is charged, will be between 200 and 1000 cf. per ton of steel produced, applied at an input rate of 50 to 300 C. F. H. per ton of furnace capacity. Thus in a 250-ton furnace, total oxygen to be used is between 50,000 and 250,000 cf. and the rate of input is between 12,000 and 75,000 C. F. H. While in general, the larger the $O_2$ usage, the shorter the refining period, the benefits decrease toward the upper end of the ranges and the use of larger amounts ordinarily will not be economical. Moreover in any particular heat, however, $O_2$ usage will be influenced by the particular conditions of slag, bath temperature and reactions which obtain during the course of the heat. As in conventional open-hearth practice, such factors can vary unpredictably from heat to heat. Adjustment of $O_2$ input affords one means of meeting these variations, accordingly the use of values intermediate in the foregoing ranges will generally be preferred. Conventional open-hearth practices, of course, are followed in making major corrections.

Prior attempts to use oxygen in the open hearth when the carbon of the melt is above 0.3% have involved introducing the gas through a lance having a single relatively large diameter orifice, for example 30,000 C. F. H. of $O_2$ through a 1-inch diameter pipe, and have invariably failed due to excessive fuming and splashing with attendant damage to refractories. We have discovered that the operation may be successfully conducted at this and higher rates if:

(1) The required oxygen is introduced as several streams contacting the metal at separate areas spaced sufficiently one from the other to be isolated zones of impingement and reaction.

(2) The velocity (at the orifice or point of introduction) of each stream is between 400 and 1100 F. P. S.

(3) The rate of delivery of each stream is not more than 6500 C. F. H.

(4) The streams are introduced toward the metal from distances of 6 to 18 inches above the surface thereof.

The limitations, minimum stream velocity=400 F. P. S. and maximum delivery rate per stream=6500 C. F. H., set the maximum orifice diameter at $63/64$ inches. Smaller orifices are normally used, however, if the diameter is less than $9/16$ inches a lower delivery rate obtains since maximum stream velocity must not exceed 1100 F. P. S. The number of orifices will depend on the size selected and the rate of $O_2$ input desired. For example, operation of a 250-ton furnace at a maximum input of 45,000 C. F. H. would require seven (7) $5/8$-inch or nine (9) $1/2$-inch diameter orifices; for a maximum input of 30,000 C. F. H., five (5) $5/8$-inch or six (6) $1/2$-inch orifices would be sufficient.

While the required individual streams of $O_2$ can be applied at remotely spaced locations, the use of a multi-orificed lance of the general design shown in Figures 2 and 3 is satisfactory and is preferred for reasons of economy of installation and convenience of operation. Because of the complexities of stream flow and the turbulence at the place of impingement of an $O_2$ stream, the area affected by the stream cannot be accurately determined and consequently a meaningful value, in lineal units, of the minimum spacing of adjacent zones of impingement and reaction cannot be specified. However, we have determined that the following factors satisfactorily define the operational limits when using multi-orificed lances:

(1) The individual streams should be directed to diverge from the vertical axis of the lance at angle B of 20 to 30°.

(2) Adjacent individual streams should diverge from each other at an angle C of not less than 14°.

(3) The distance between centers of adjacent orifices at the delivery end shall not be less than 2½ times the diameter of the orifice.

Location of the lance at about the center of the bath is a matter of economy; the open hearth being a regenerative type furnace, a central location with respect to the length of the furnace affords equal time on both cycles for the burning of the CO evolving from the bath and thus provides for uniform and maximum utilization of the heat potential of the refining reactions.

While the practices of the present invention have particular reference to the use of $O_2$ in the open hearth when the carbon content of the melt is above 0.3%, they also diminish fuming in the remainder of the refining period. Accordingly, although not critical, it is advantageous when producing low-carbon steel (i. e. C below 0.10%) to continue the use of $O_2$ in accordance with the foregoing principles until the desired tap carbon is reached. When producing steel containing 0.2% or more carbon, we prefer to discontinue the use of $O_2$ when the carbon has been reduced to within 10 to 15 points of tap value.

It should also be mentioned that, if desired, $O_2$ can be introduced prior to the hot metal addition, i. e. during the melt-down period. The effect is to speed the melting and oxidation of the scrap. The foregoing limits relative oxygen-input during the refining period do not apply to oxygen introduced during melt down. However, the use of multi-streams in accordance with the principles of this invention will increase the efficiency of $O_2$ utilization in this period of a heat.

The use of oxygen in the open hearth reduces the fuel requirements: (1) heat losses from the furnace are reduced in proportion to the reduction in processing time, (2) the reactions involving oxygen are exothermic and supply heat directly to the bath. The practices of the present invention reduce the total fuel requirement by as much as 50%. The usual open-hearth fuel practices may be followed in meeting the remainder of the fuel requirement. However, it will be found advantageous to use a higher air-fuel ratio after melt down in order to burn off the larger quantities of CO evolved per unit time as the result of shortening refining period.

The practices and results of the present invention are illustrated in the following examples in which the principles outlined above were applied to the operation of a 335-ton open-hearth furnace producing low carbon (0.10% C) steel. Oxygen was used in the processing of heats A and B; heat C was processed in the conventional manner and is included for purposes of comparison. Condensed logs of the three heats are tabulated below.

Table I

|  | Heat A | Heat B | Heat C |
|---|---|---|---|
| Charge: |  |  |  |
| Limestone (pounds) | 19,500 | 23,100 | 23,300 |
| Ore (pounds) | 44,300 | 41,900 | 48,000 |
| Iron-Cold (pounds) | 112,600 |  | 101,400 |
| Iron-Hot (pounds) | 323,200 | 439,800 | 365,800 |
| Scrap (pounds) | 337,375 | 287,300 | 272,800 |
| Working Additions: |  |  |  |
| Ore (pounds) |  | 3,000 | 13,000 |
| Roll Scale (pounds) | 6,500 | 6,500 |  |
| Limestone (pounds) | 4,000 | 8,000 | 8,000 |
| Burnt Lime (pounds) |  |  | 2,500 |
| Spar (pounds) | 400 |  | 900 |
| Oxygen: |  |  |  |
| Input Rate (C. F. H.) | 25,000 | 30,000 | 0 |
| Usage (Cu. Ft. per Ton) | 311 | 326 | 0 |
| Fuel (MM-B. t. u./Ton) | 2.212 | 1.997 | 3.149 |
| Tap Carbon (percent) | 0.05 | 0.08 | 0.08 |

|  | Hr. | Min. | Hr. | Min. | Hr. | Min. |
|---|---|---|---|---|---|---|
| Lapsed Time: |  |  |  |  |  |  |
| Start Charge | 0 | 0 | 0 | 0 | 0 | 0 |
| Finish Charge | 2 | 6 | 1 | 31 | 1 | 30 |
| Start Hot Metal | 2 | 53 | 2 | 31 | 3 | 24 |
| Finish Hot Metal | 2 | 53 | 3 | 1 | 3 | 41 |
| Tap | 6 | 31 | 5 | 41 | 8 | 58 |
| Refining Time: |  |  |  |  |  |  |
| (HM to Tap) | 3 | 38 | 3 | 10 | 5 | 34 |

Normal charging practices were used with the exception that in heats A and B, limestone was not charged through the center door of the furnace for reasons previously stated. This practice is preferred but is not essential. It will be noted that about 10,000 pounds less iron oxide (ore or ore and roll scale) was used in the $O_2$ heats, otherwise the charge and working additions are normal.

Oxygen was introduced in heats A and B through a lance having six ½-inch diameter orifices arranged equi-distant points about a 3¼-inch diameter circle in the end of the lance and having divergence angles B and C of 20° each; such lances being capable of introducing up to about 32,000 C. F. H. during the refining period of the heat.

In heat A, introduction of $O_2$ was started 15 minutes after completion of charging of solids; in heat B about 40 minutes thereafter. In both heats, after addition of the hot metal, the lance was adjusted to within about 8 inches of the surface of the metal and maintained in this position throughout the refining period. In both heats $O_2$ was introduced at a substantially constant rate until tap carbon was reached, at which time the lance was raised and the $O_2$ shut off.

The lower rate of input (25,000 C. F. H.) used in heat A resulted in an oxygen usage of 311 cu. ft. per ton of steel produced and a time reduction of about 2 hours in the refining period. The use of the higher rate (30,000 C. F. H.) in heat B increased $O_2$ usage to 326 cu. ft. ton of steel but reduced the refining period by approximately 2 hours and 20 minutes. Fuel saving amounted to about 30% in heat A and about 37% in heat B. No objectionable splashing or fuming occurred in either heat, in fact, the fume was no heavier than that produced when operating the furnace in the conventional manner nor was there any evidence of abnormal wear of the refractories in the furnace or its checkers.

Similar results have been obtained in experiments using a lance having six ⅝-inch diameter orifices, and in others six ⅜-inch orifices. In the latter instance, the input rate had to be held below 18,500 C. F. H., in order not to exceed the critical limits regarding $O_2$ introduction when bath C is above 0.3%, and the reduction in refining time and fuel consumption was proportionately less.

While we have shown and described certain specific embodiments of our invention, we do not wish to be limited exactly thereto except as defined in the following claims.

We claim:
1. In the method of operating steelmaking open-hearth furnaces to produce steel of a desired carbon content comprising the steps of charging suitable quantities of iron oxide, stone, ferrous scrap and pig iron and of burning a suitable fuel over said charge to effect a molten bath and the refining thereof, the combination therewith of the step of applying elemental oxygen to the surface of said bath from the beginning of the refining period and for such time thereafter as the carbon content of the bath is greater than about 0.3%, applying said oxygen during such interval in an amount between 200 and 1000 cubic feet per ton of metal bath at a rate of between 50 and 300 C. F. H. per ton and in a plurality of individual streams directed to contact the bath surface at separate spots spaced sufficiently apart to provide an isolated reaction zone for each stream, and regulating each of said individual streams to deliver no more than 6500 C. F. H. of oxygen at a velocity between 400 and 1100 F. P. S. whereby deleterious fuming and splashing resulting from the application of oxygen when the carbon content of the bath is above 0.3% is eliminated.

2. The method of claim 1 in which the individual streams are applied from a source 6 to 18 inches above the bath surface.

3. The method of claim 2 in which a plurality of the required individual streams of oxygen are applied from a single source vertically depending through the roof of the furnace and having a plurality of orifices of a diameter to deliver streams of the required volume and velocity circularly spaced apart at least 2½ times said diameter about the vertical axis of said source and inclined with respect to said axis to deliver streams diverging outwardly therefrom at an angle of between 20 and 30° with adjacent streams diverging at least 14° whereby said streams issuing from said source contact the surface of the bath at separate spots spaced sufficiently one from the other to provide an isolated reaction zone for each stream.

References Cited in the file of this patent

UNITED STATES PATENTS

| | | |
|---|---|---|
| 2,515,631 | Chiswik | July 18, 1950 |
| 2,580,614 | Slottman | Jan. 1, 1952 |
| 2,593,505 | Wagstaff | Apr. 22, 1952 |
| 2,733,141 | Sims | Jan. 31, 1956 |

FOREIGN PATENTS

| | | |
|---|---|---|
| 623,881 | Great Britain | May 24, 1949 |
| 700,224 | Great Britain | Nov. 25, 1953 |
| 737,005 | Great Britain | Sept. 21, 1955 |